United States Patent Office 3,406,096
Patented Oct. 15, 1968

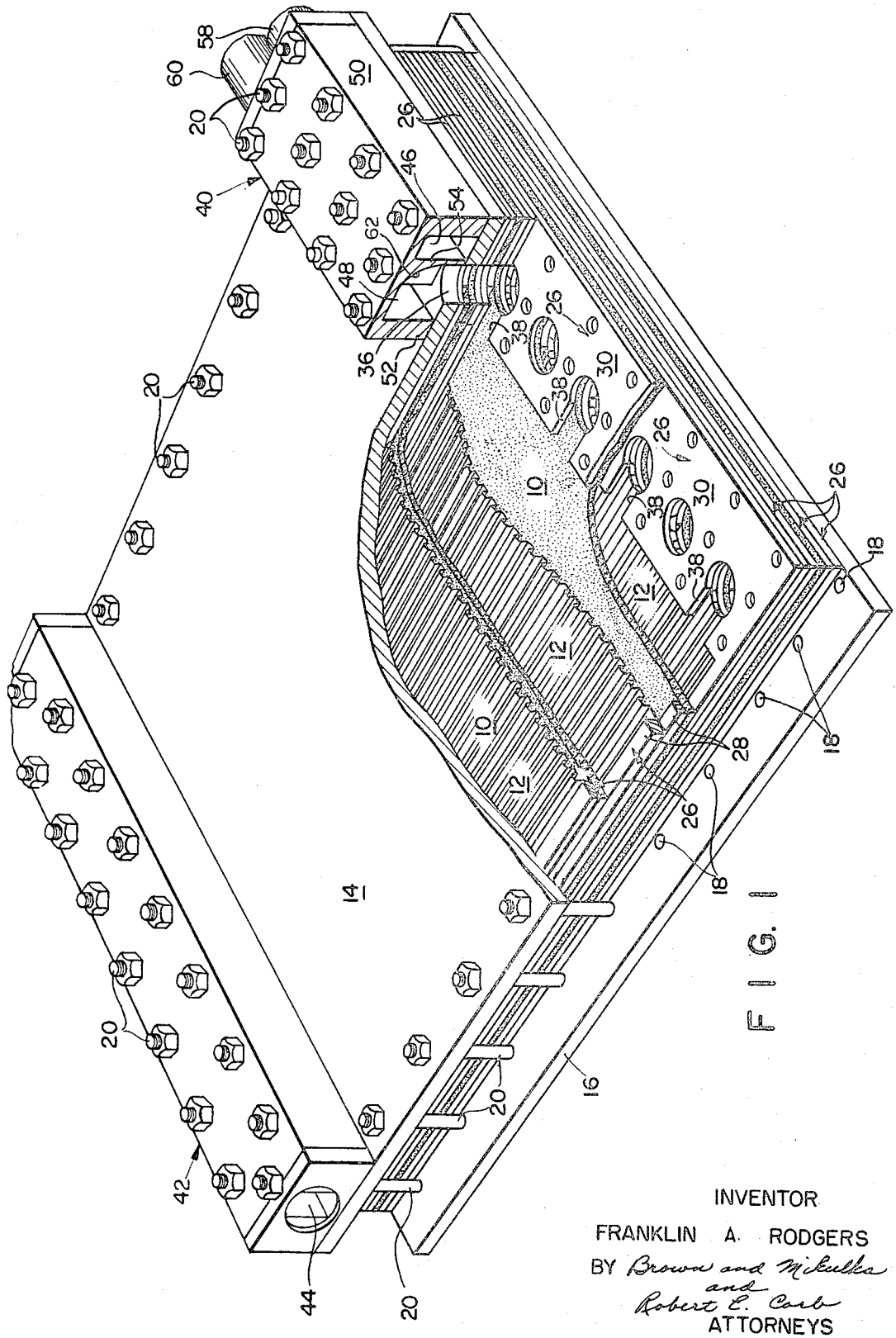

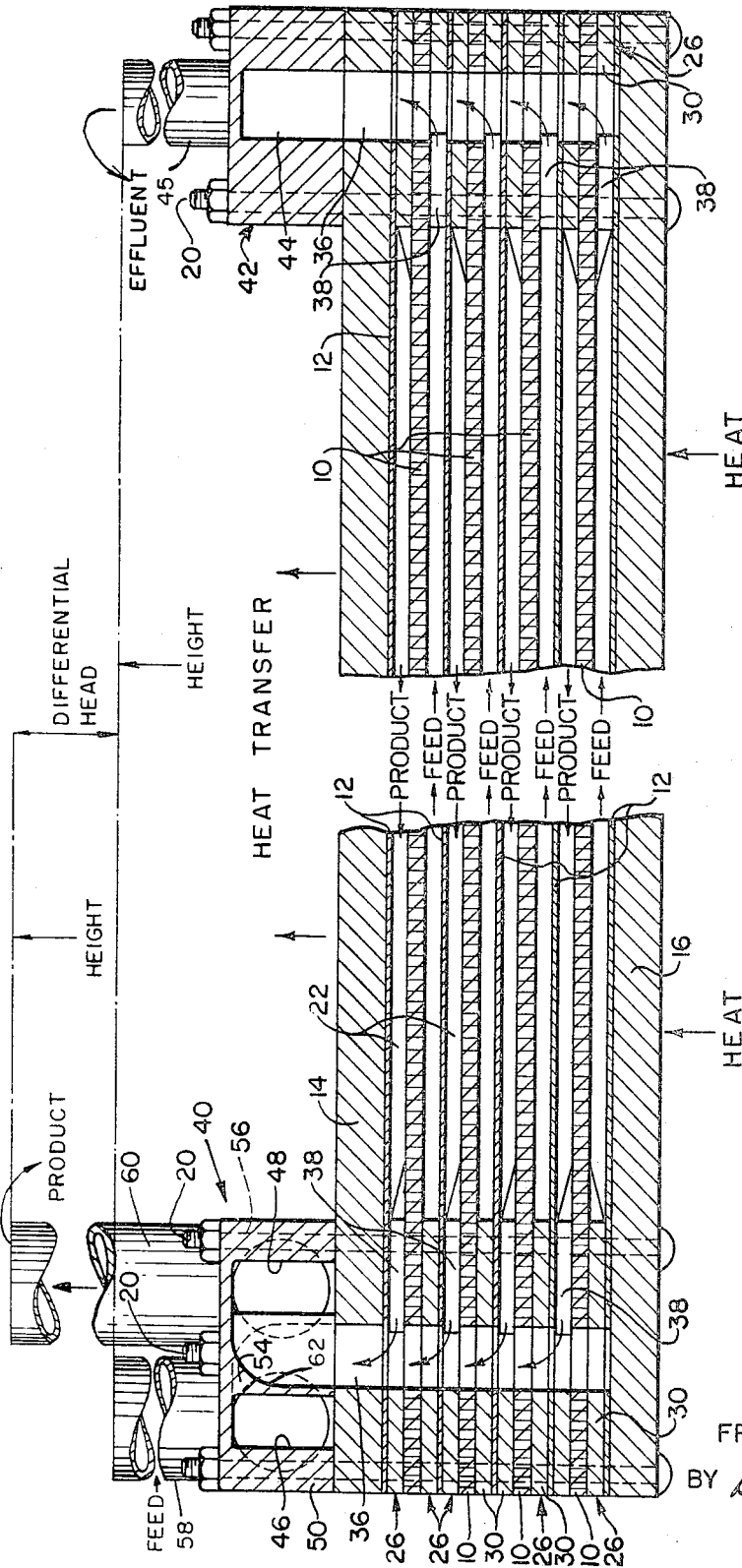

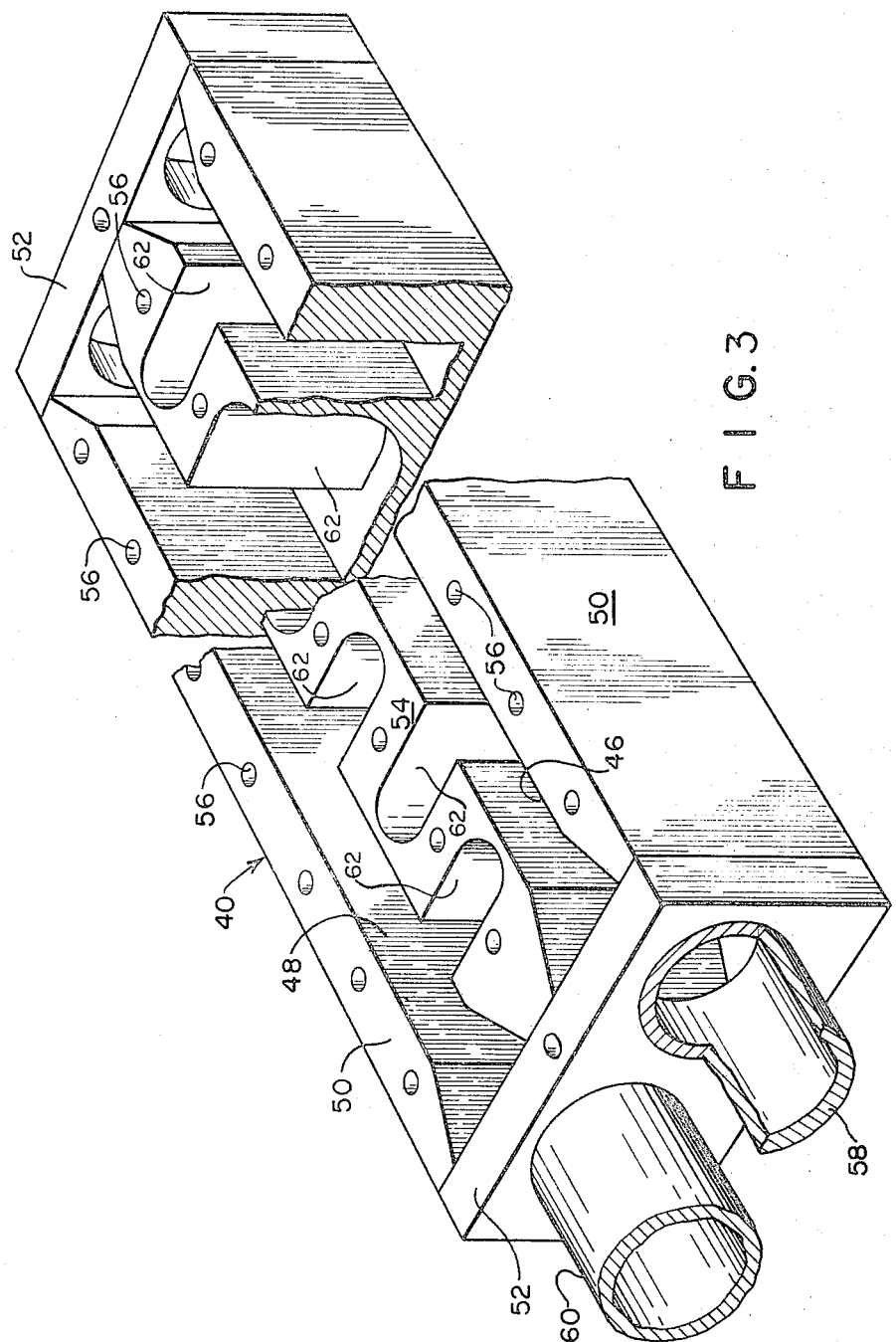

3,406,096
DISTILLATION UNDER HYDROSTATIC PRESSURE
WITH VAPOR PERMEABLE MEMBRANE
Franklin A. Rodgers, Los Altos, Calif., assignor to
Pactide Corporation, Cambridge, Mass., a corporation of Delaware
Filed Nov. 26, 1965, Ser. No. 510,014
7 Claims. (Cl. 202—172)

ABSTRACT OF THE DISCLOSURE

In a still in which a layer of distilland liquid in contact with one side of a microporous membrane is heated to vaporize the liquid while a layer of distillate liquid in contact with the opposite side of a membrane is cooled to transfer and condense the vapor, the distillate is maintained at a higher hydrostatic pressure than the distilland to prevent contamination of the distillate should a leak occur in the membrane.

---

This invention relates to novel and improved distillation apparatus for transferring liquid directly from one body of liquid to another across a vapor permeable barrier.

In the copending U.S. patent application of Franklin A. Rodgers Ser. No. 456,040, filed May 7, 1965, abandoned and now application Ser. No. 524,366, filed Sept. 27, 1965, there is described distillation apparatus particularly adapted for the desalination of water and including as the basic components thereof, a porous film that operates as a barrier to liquids while readily passing the vapors of the liquids, means for forming thin evaporating and condensing layers of the liquids in contact with opposite sides of the porous film, and means for transferring heat to the evaporating layer and from the condensing layer. The porous film includes a multiplicity of microscopic, gas-filled, through passages having walls non-wettable by the liquid for passing substantially only the vapor of the liquid and gases dissolved therein from the evaporating layer to the condensing layer. The porous film and the means for forming the evaporating and condensing layers preferably constitute one liquid transfer stage of a multiple stage still in which adjacent condensing and evaporating layers of adjacent stages are separated by liquid and vapor impermeable barriers, and heat is transferred from the condensing layer of each stage to the evaporating layer of the next succeeding stage.

An object of the invention is to provide multiple stage distillation apparatus of the type described having a novel, improved and less expensive construction that facilitates fabrication and assembly of the multiple stage apparatus and provides for more efficient operation.

In distillation apparatus of this type, the feed liquid (e.g. salt water) and the product liquid (e.g. potable water) comprise thin layers disposed in direct contact with the porous film that separates them so that any failure in the liquid impermeability of the film occasioned, for example, by an imperfection in or breakdown of the porous film structure or the waterproofing of the microscopic passages may result in leaking of the feed liquid (salt water) from an evaporating layer through the porous barrier film to the condensing layer on the product side of the porous film, and contamination of the product.

Another object of the invention is to provide distillation apparatus as described including means for insuring that leakage of liquid from evaporating layers on the feed side of the porous films to condensing layers of the product side of the porous barrier films cannot occur.

Other objects of the invention will in part be obvious and will in part appear hereinafter. The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGURE 1 is a perspective view, partially in section, showing distillation apparatus embodying the present invention, with the thickness of components exaggerated for purposes of illustration;

FIG. 2 is a sectional view of the apparatus of FIGURE 1, the section being taken lengthwise thereof; and FIG. 3 is a perspective view, partially in section, of another component of the apparatus.

The present invention is incorporated in an inexpensive yet highly efficient, compact, multiple effect still made possible largely by the provision of thin porous films that are impervious to liquids while readily passing the vapors thereof. The basic components of the still including a multiplicity of such porous films arranged in stacked relation together with vapor and liquid impervious films disposed between the porous films to separate the condensing layer (liquid) of each stage from the evaporating layer of the next succeeding stage. Both the porous and impervious films are quite thin as are the liquid layers confined therebetween so that a large number of distillation stages can be embodied in a relatively small assembly, and the films are preferably formed of materials, particularly organic plastics, that are inexpensive and easy to fabricate.

As previously noted, the basic components of an individual distillation stage are a porous film and an impervious film for forming and maintaining the liquid evaporating and condensing layers. The porous film is substantially as described in the aforementioned application and comprises a thin sheet material formed with a multiplicity of microscopic through pores or passages of substantially uniform size, and occupying the major portion (e.g. 80–85%) of the total volume of the film. The porous film is designed to permit operation of the still with the films or sheets of evaporating and condensing liquid in direct contact with the surfaces of the porous film and with the liquids at hydrostatic pressures equal to or greater than the pressures of the other portions of the system, particularly the gas within the pores of the film. To make this operating condition possible while reducing to a minimum the resistance to diffusion of vapor, the pores are preferably of a maximum size while being so constituted as to be unable to pass the liquid, and the apparatus is operated under conditions such that the pores contain only the vapor of the liquid and any gas dissolved therein substantially at the vapor pressure of the liquid (and any dissolved gas).

The walls of the passages in the porous film are non-wettable by the particular liquid for which the apparatus is designed, and the cross sections of the pores or through passages are preferably circular but may be oblate and/or irregular. However, in order to determine optimum size the pores are considered to have essentially circular cross sections with an effective diameter of a circular hole which functions in the same manner. The maximum effective diameter for each pore is dependent upon the surface tension ($\gamma$) of the vaporizable liquid, the angle of contact ($\theta$) at the liquid-gas interface and the differential between the absolute hydrostatic pressure of the evaporating liquid and the absolute pressure of the gas within the pores ($\Delta P$). Under the operating conditions each pore should have the largest possible effective diameter that does not exceed the value:

$$-\frac{4\gamma \cos \theta}{\Delta P}$$

It is important that the pores occupy the largest possible proportion of the film because vapor transfer through the pores and the thermal conductivity of the film are respectively, directly, and inversely related to the proportion of the solids comprising the film, and thermal conductivity of the porous film should be as small as possible because heat-transfer between bodies of liquid on opposite sides of the porous film should be by way of the vapor in the pores rather than by conduction by the film.

Materials useful for the porous film include organic plastics that are insoluble in and compatible with the particular vaporizable liquid (e.g. water) to be purified by the distillation apparatus, and able to withstand the operating temperatures encountered. Materials useful for the porous film in stills designed to desalinate water, include, for example, polyvinyl chloride, cellulose nitrate, celluose acetate, cellulose triacetate, nylon, and polytetrafluorethylene. The porous plastic film may be inherently non-wettable by the liquid and/or it may be treated in such a way as to render the surfaces including the pores, non-wetting. For example, a cellulose nitrate microscopic porous filter media, such as sold by Millipore Filter Corporation under the trade mark "Standard MF" and having a thickness of approximately 0.006 inch and pores with an effective diameter of 0.45 micron, may be coated with a silicone water repellant such as sold by General Electric Company under the trade name "Dri-film" No. 1040 or No. 1042, or designated SS 4029, to provide a non-wetting porous film suitable for incorporation in the still of the invention.

In a multiple effect or multiple stage still, liquid and vapor impermeable barrier films are alternated with porous films to form, maintain and separate the evaporating and condensing layers of sheets of liquid as well as to provide a good thermal conduction for promoting heat-transfer from the condensing layer of each stage to the evaporating layer of the next succeeding stage. The impermeable barrier films are formed of the thinnest possible sheet material in order to reduce resistance to heat transfer to a minimum, particularly in stages of the apparatus at which the operating temperature is relatively low and thermal conductivity may constitute a major factor in overall operating efficiency. The composition of the impermeable barrier film depends primarily on the nature of the particular liquids involved including compatibility of the film with the liquids, the operating temperature of the apparatus, cost, ease of fabrication and assembly, and thermal conductivity. Suitable materials include metals such as copper and aluminum having good thermal conductivity and available in sheet form, and less expensive materials, particularly organic plastics, having the requisite structural strength at the operating conditions of temperature and pressure. Sheet materials particularly suitable as impervious films useful in stills designed to desalinate water include fluorocarbons such as polyvinylidene fluoride, desirable because of its superior dimensional and chemical stability under conditions of 100% humidity and high temperature and resistance to damage from biological growth.

Reference is now made to FIGURES 1 through 3 of the drawings wherein there is illustrated a multiple effect still embodying the invention. For purposes of clarity of illustration, many of the dimensions of the elements, particularly thickness, have been exaggerated or otherwise shown distorted out of proportion. The still comprises a multiplicity of porous films 10 and impervious barrier films 12 assembled together in alternating stacked relation between a pair of header plates 14 and 16. The porous and barrier films are preferably rectangular in shape and substantially coextensive with one another, and the header plates are located on opposite sides, i.e., top and bottom, of the stack of films, are also rectangular and extend beyond the edges of the stack of films. Header plates 14 and 16 function to retain the stack of films together as an assembly and are formed with through holes 18 near the end and longitudinal edges to accommodate bolts 20 for clamping the stack of films between the header plates under compressive pressure at the margins of the films. In an alternative embodiment, the header plates may be constructed (e.g., in the form of frames) to apply compressive pressure only to the margins of the stacks and thereby perform their basic function of preventing escape of liquids at the edges of the films.

In the form of still shown, the films and header plates are generally planar and although the still may be operated in substantially any position, it is preferably oriented with the films, header plates, and layers of evaporating and condensing liquids disposed in horizontal planes. The assembly comprises, in order, an upper header plate 14, an impervious film 12, a multiplicity of porous films 10 arranged in alternating, repetitive order, and impervious films 12 terminating in an impervious films, and a lower header plate 16. The porous and barrier films cooperate to form shallow channels of depths of the order of the thickness of the porous films, through which the liquids comprising the evaporating and condensing layers are circulated. In the form of still shown, heat is transferred to lower header plate 16 and transferred from upper header plate 14 so that in operation, the feed liquid (e.g. salt water) is introduced between the underside of each porous film and the upper surface of the adjacent barrier film, and the product (e.g. potable water) is withdrawn from the channels between the upper surfaces of the porous films and the adjacent barrier films. Any suitable means of a type well-known in the art may be employed to transfer heat to and from the appropriate header plates including, for example, employing the feed liquid, either directly or by a heat exchanger, to cool the upper header plate, and solar energy, either directly or by a heat exchanger, to apply heat to the opposite side of the stack of sheets.

Impervious barrier films 12 are designated both to separate the evaporating and condensing liquid layers and to physically space apart porous films 10 to provide the channels containing the liquids comprising the condensing and evaporating layers. Barrier films 12 are preferably very thin having a thickness of the order of .0010", and in order to support adjacent porous films apart from one another to provide the requisite channels for the liquids, the impervious barrier films are corrugated so as to have a generally sinusoidal profile. In the assembly of films comprising the still, the corrugations and the channels provided thereby extend from end to end of the assembly in generally parallel relation so that flow of the liquids comprising the condensing and evaporating layers is lengthwise of the assembly.

The still includes means for feeding a liquid such as salt water to the proper channels to provide the evaporating layers; withdrawing the product liquid, e.g., potable water, from the channels containing the condensing layers; and withdrawing the effluent, e.g., concentrated salt water, from the channels containing the evaporating layers. These same means also provide for sealing the assembly of stacked films to prevent leakage of the liquids and in the form shown comprise a plurality of rectangular gaskets 26, generally coextensive in size and shape with the porous and barrier films. Each gasket 26 is in the form of a frame having relatively narrow lateral portions 28, and relatively wide end portions 30. Gasket 26 is disposed between each barrier film and the adjacent porous film so that the order of films and gaskets in the assembly is a barrier film 12, gasket 26, porous film 10, gasket 26, and barrier film 12. The assembly of films and gaskets is clamped between the header plates so that the lateral and end portions of the gasket, and the end and lateral marginal portions of the porous and barrier films are under compression sufficient to prevent escape of the liquids from between the films and gaskets at the edges thereof. The end portions of the porous and barrier films and gaskets are provided with holes 32, similar to and aligned with holes 18 in the header plates for accommodating bolts 20.

In order to provide for introduction and withdrawal of the liquids constituting the evaporating and condensing layers, the end portions of the porous and barrier films, and end portions 30 of the gaskets 26, are formed with aligned circular holes 34, and header plate 14 is provided with similar circular holes 36 also aligned with holes 34. The compressive pressure on the end portions of the films and gaskets is sufficient to flatten the corrugated barrier films and prevent leakage into or from the conduits, defined by holes 34 and 36, between the various films. To provide for introduction of the appropriate liquid from a conduit defined by holes 34 between the proper porous and barrier films, slots or channels 38 are provided in end portions 30 of the gaskets extending from holes 34 through the inner edge of the end portions of the gaskets. The corrugations of the barrier films extend into channels 38 where they are engaged without being compressed between the end portions of the gaskets and the films and remain substantially in their extended condition within the channels between adjacent porous films and gaskets to maintain the channels in an open position on the appropriate sides of the barrier films. A suitable adhesive or sealant may be employed between the films and gaskets to further insure retention of the films together as a unitary assembly, prevent leakage at the gaskets and fill the corrugations in one side of each barrier film in each channel 38.

The liquids are introduced into and withdrawn from the still through suitable means such as manifolds 40 and 42 mounted on header plate 14 at opposite ends thereof. In the preferred form of the still shown in the drawings, the feed liquid or influent is introduced at one end thereof, the effluent is drawn off at the opposite end, and the product liquid is extracted from the still at the same end as the feed liquid is introduced so that flow of the feed and product liquids constituting the evaporating and condensing layers is in opposite directions. Accordingly, the end portions of the gaskets at the end of the still at which the feed liquid is introduced and the product liquid is withdrawn, are provided with slots or channels 38 extending from the inner edge of the end portion to every other hole 34, and the gaskets are arranged so that the slots in every other gasket are aligned, i.e., the slots in adjacent gaskets are staggered. The feed liquid is introduced through the conduits formed by every second hole 34, and the product liquid is withdrawn through the conduits, defined by alternate holes 34 located between holes through which the feed liquid is introduced. In this manner, the liquid layers located on opposite sides of each barrier film comprise the different liquids constituting the evaporating and condensing layers. At the opposite end of the assembly from which the effluent is withdrawn, holes 34 and 36 are fewer in number since the quantity of effluent is less than the quantity of feed water, and only those holes 34 in the gaskets having slots 38 through which the feed water is introduced, are provided with slots 38 for forming channels through which the effluent is withdrawn.

The feed liquid or influent, e.g., salt water, is introduced through manifold 40; the product liquid, e.g., fresh water, is withdrawn through manifold 40; and the effluent e.g., concentrated salt water, is withdrawn from manifold 42. Manifold 42 is quite simple comprising a block bolted to header plate 14 in covering relation to holes 36 in one end of the header plate, and having a longitudinal channel or recess 44 opening toward the header plate and communicating with holes 36. Manifold 40 is a double manifold inasmuch as it must deliver different liquids to and from alternate holes 36 at one end of the header plate 14. Manifold 40 is illustrated in FIG. 3 as comprising a block having two longitudinal channels, designated 46 and 48, defined by outer side walls 50 and end walls 52 and separated by a medial wall 54. The medial wall is designed to extend across and in closing relation to walls 36 in the header plate and the side and medial walls are provided with holes 56 aligned with holes 32 in the header plate for receiving bolts 20. Channels 46 and 48 communicate with openings in end plates 52 in turn coupled to suitable conduits designated 58, for delivering liquids to and from the channels. Medial wall 54 is formed with a plurality of delivery recesses or passages 62, each positioned for alignment with a hole 36 in the header plate and with adjacent delivery passages 62. Adjacent passages 60 open in opposite directions into channels 46 and 48 so that every other delivery passage provides a conduit from one of channels 46 and 48 to the appropriate holes 36 in the header plate when the manifold is secured to the header plate in proper position. An appropriately formed gasket may be provided between the facing surfaces of the manifold and header plate to prevent leakage of the liquids therebetween.

Porous films 10 are desgined to be impermeable to liquids while transmitting the vapors thereof. However, for various reasons including for example, exceptionally large pores and other imperfections in the porous films and/or the waterproofing thereof, a small number of pores may transmit or allow the passage of liquid from one side of a porous film to the other. If this leakage occurs from an evaporating layer to a condensing layer, the product, e.g., potable water, will be contaminated by the feed or influent, e.g., salt water, and it is highly desirable, of course, that this should not occur. On the other hand, a small amount of leakage from the product sides of the porous film to the feed sides can be tolerated since it will only result in a slight diminution in the output of product liquid. In order to insure that any liquid leakage that may occur across the porous films is from the condensing to the evaporating layers, the liquid constituting the condensing layers is maintained at a slightly higher hydrostatic pressure than the liquid in the evaporating layers. This is accomplished, for example, by employing stand pipes, or their equivalent, coupled with at least the condensing layers. In the form of the apparatus shown, conduit 60, coupled with channel 48 in manifold 40 in turn coupled by passages 62 with the holes 36 in the header plate 14 through which the product is withdrawn, is coupled with or is designed to function as a stand pipe terminating at a predetermined height above the still so as to establish a predeterminedly higher hydrostatic pressure within the layers of product liquid than within the layers of feed liquid. Conduit 45, coupled with manifold 52, and conduit 58 also may be coupled with or function as shorter stand pipes terminating at a height lower than conduit 60 in order to more accurately control the hydrostatic pressure of the feed and effluent liquids and hence, more accurately control the differences in hydrostatic pressures of the evaporating and condensing layers. This difference, for the most efficient operation of the still, should be as small as possible and may be very slight since any differences in favor of the condensing layers, however small, will insure that any leakage across the porous films will be from the condensing to the evaporating layers.

Since certain changes may be made in the above apparatus without departing from the scope of the invention herein involved, it is intended that all matter contained in the above description shall be interpreted as illustrative and not in a limiting sense.

What is claimed is:
1. In a still, in combination:
    means for forming an evaporating layer of vaporizable liquid at a predetermined hydrostatic pressure;
    means for forming a condensing layer of said vaporizable liquid at a higher hydrostatic pressure and at a relatively lower temperature than said evaporating layer; and a barrier between said layers for transmitting the vapor of said liquid, said barrier being capable of maintaining a difference in pressure between said evaporating and condensing layers;

the hydrostatic pressure differential being sufficient to prevent leakage of liquid from said evaporating layer to said condensing layer.

2. Distillation apparatus comprising, in combination:

means including a barrier for forming a thin layer of distilland;

means including said barrier for forming a thin layer of distillate;

means for transferring heat to said layer of said distilland to vaporize said distilland;

means for transferring heat from said layer of distillate to condense said vapor; and means for maintaining said distillate in said thin layer at a higher hydrostatic pressure than said distilland in said thin layer thereof the pressure differential being sufficient to prevent leakage from said layer of distilland to said layer of distillate;

said barrier being capable of maintaining said pressure differential.

3. The distillation apparatus of claim 2 wherein said barrier comprises a porous film non-wettable by said distilland disposed between and in contact with said layers.

4. In distillation apparatus including a porous film comprising a multiplicity of microscopic, gas-filled through passages having walls non-wettable by a vaporizable liquid for passing substantially only the vapor of said liquid and gases dissolved therein from a layer of said liquid in contact with said film when said apparatus is operated with a predetermined maximum pressure differential between said layer of said liquid and gases within said passages, means for forming evaporating and condensing layers of said vaporizable liquid in contact with opposite sides of said film and means for maintaining said evaporating layer at a higher temperature than said condensing layer, in combination:

means for maintaining said evaporating layer at a predetermined hydrostatic pressure; and means for maintaining said condensing layer at a predeterminedly higher hydrostatic pressure, the pressure differential being sufficient to prevent leakage of liquid from said evaporating layer to said condensing layer;

said porous film being capable of maintaining said pressure differential.

5. Distillation apparatus as defined in claim 4 wherein the last-mentioned means for maintaining layers at predetermined hydrostatic pressures include a stand pipe.

6. Distillation apparatus comprising, in combination:

a porous film including a multiplicity of microscopic, gas-filled through passages havng walls non-wettable by a vaporizable liquid for passing substantially only the vapor of liquid said liquid and gases dissolved therein from a layer of said liquid in contact with said film when said apparatus is operated with a predetermined maximum pressure differential between said liquid layer and gases, including said vapor, within said passages;

means for maintaining an evaporating layer including said vaporizable liquid at a predetermined hydrostatic pressure in contact with one side of said film;

means for transferring heat to said evaporating layer;

means for maintaining a condensing layer of said vaporizable liquid at a higher hydrostatic pressure in contact with the opposite side of said film the difference in pressure between said layers being sufficient to prevent leakage of liquid from said evaporating layer to said condensing layer;

said porous film being capable of maintaining said difference in pressure; and means for transferring heat from said condensing layer.

7. Distillation apparatus as defined in claim 6 wherein said means for maintaining said evaporating and condensing layers include liquid and vapor impermeable barrier films located in juxtaposed facing relation with the surfaces of said porous film and a major portion of each of said barrier films spaced a predetermined distance from said porous film to provide channels for said liquids.

References Cited

UNITED STATES PATENTS

| 3,340,186 | 9/1967 | Weyl | 203—10 X |
| 2,386,826 | 10/1945 | Wallach et al. | |
| 2,506,656 | 5/1950 | Wallach et al. | 55—16 |
| 2,861,038 | 11/1958 | Steinmann et al. | 210—23 |
| 3,129,146 | 4/1964 | Hassler | 202—172 X |
| 3,240,683 | 3/1966 | Rodgers | 202—173 |

NORMAN YUDKOFF, *Primary Examiner.*

D. EDWARDS, *Assistant Examiner.*